(12) United States Patent
Grafenberg et al.

(10) Patent No.: US 8,024,010 B2
(45) Date of Patent: Sep. 20, 2011

(54) RADIO TRANSMISSION APPARATUS AND CONTROL APPARATUS FOR EVENTS ROOMS AS WELL AS CORRESPONDING METHOD

(75) Inventors: Esfandiar Grafenberg, Effeltrich (DE); Uwe Rass, Nürnberg (DE)

(73) Assignee: Siemens Audiologische Technik GmbH

( * ) Notice: Subject to any disclaimer, the term of this patent is extended or adjusted under 35 U.S.C. 154(b) by 854 days.

(21) Appl. No.: 11/788,149

(22) Filed: Apr. 19, 2007

(65) Prior Publication Data
US 2007/0249289 A1 Oct. 25, 2007

(30) Foreign Application Priority Data

Apr. 19, 2006 (DE) .................. 10 2006 018 155

(51) Int. Cl.
*H04B 1/38* (2006.01)
(52) U.S. Cl. ................. 455/567; 455/404.1; 455/456.4; 455/69
(58) Field of Classification Search .......... 455/41.1, 455/42–45, 69, 456, 227, 229; 381/80, 81, 381/82, 85, 123
See application file for complete search history.

(56) References Cited

U.S. PATENT DOCUMENTS

| | | | | |
|---|---|---|---|---|
| 4,700,179 A | * | 10/1987 | Fancher | 340/572.2 |
| 5,734,964 A | | 3/1998 | Fishman et al. | |
| 5,771,438 A | * | 6/1998 | Palermo et al. | 455/41.1 |
| 6,122,486 A | * | 9/2000 | Tanaka et al. | 455/68 |
| 6,377,608 B1 | * | 4/2002 | Zyren | 375/132 |
| 6,496,703 B1 | * | 12/2002 | da Silva | 455/456.4 |
| 6,823,199 B2 | * | 11/2004 | Gough | 455/567 |
| 7,039,426 B2 | * | 5/2006 | Naiki | 455/456.4 |
| 7,183,919 B2 | * | 2/2007 | Wang | 340/572.1 |
| 2001/0052846 A1 | * | 12/2001 | Jespersen | 340/539 |
| 2003/0034887 A1 | * | 2/2003 | Crabtree et al. | 340/539 |
| 2003/0044033 A1 | | 3/2003 | Julstrom et al. | |
| 2005/0261000 A1 | | 11/2005 | Heck | |

FOREIGN PATENT DOCUMENTS

| | | |
|---|---|---|
| DE | 100 61 507 A1 | 7/2002 |
| EP | 1531650 A2 | 5/2005 |
| GB | 2410400 A | 7/2005 |
| WO | 9845963 A1 | 10/1998 |
| WO | WO 02/23948 A1 | 3/2002 |

* cited by examiner

*Primary Examiner* — Edward Urban
*Assistant Examiner* — Ganiyu Hanidu

(57) ABSTRACT

Radio systems for supplying hearing apparatus in events rooms are of a more convenient design. To this end a radio transmission apparatus is provided for transmission of speech signals in an events room. It possesses a receive device for receiving at least one control signal and a switching device for switching the radio transmission apparatus on and/or off depending on the received control signal. In addition a control apparatus is provided for controlling the radio transmission device, with which speech signals are transmitted in an events room. This control apparatus possesses a detection device to detect a presence or a movement of the radio transmission device in the events room and a transmit device for transmitting a control signal to the radio transmission device depending on the detection result of the detection device. This allows a transmit device of a teacher to be switched off when they leave the classroom.

7 Claims, 1 Drawing Sheet

RADIO TRANSMISSION APPARATUS AND CONTROL APPARATUS FOR EVENTS ROOMS AS WELL AS CORRESPONDING METHOD

CROSS REFERENCE TO RELATED APPLICATIONS

This application claims priority of German application No. 10 2006 018 155.7 filed Apr. 19, 2006, which is incorporated by reference herein in its entirety.

FIELD OF THE INVENTION

The present invention relates to a radio transmission apparatus for transmission of speech signals in an events room. In addition the present invention relates to a control apparatus for controlling a radio transmission device with which speech signals are able to be transmitted in an events room. Furthermore the present invention relates to a corresponding method for transmission of speech signals and for control of radio transmission devices.

BACKGROUND OF THE INVENTION

FM (Frequency Modulation) systems are used, especially in classrooms, to improve the signal-to-noise ratio during the transmission of signals to hearing devices. In such cases the teacher generally wears a microphone with a transmitter and the students wear a receiver, with a connection to a hearing device where appropriate. If the teacher leaves the room and forgets to switch off the microphone, the students can listen in to conversations, taking place in the staff room for example. The teacher must thus attempt to avoid not switching off the microphone manually at the right time.

An FM multifrequency system for schools made by Phonak is known. In this system the receivers in a classroom are set automatically to a configured radio frequency. A change of classroom automatically changes the frequency at the receiver.

SUMMARY OF THE INVENTION

The object of the present invention consists in supporting the teacher or another user of an FM transmitter in switching off the transmitter in good time when it is not being used.

In accordance with the invention this object is achieved by a radio transmission apparatus for transmission of speech signals in an events room with a receiving apparatus for receiving at least one control signal and a switching apparatus for switching on and/or switching off the radio transmission apparatus depending on the received control signal.

Accordingly there is also provision in accordance with the invention for a method for transmission of speech signals in an events room by receiving a control signal in the events room and/or at the entrance to the events room with a radio transmission apparatus, switching on and/or switching off the radio transmission apparatus for transmitting the speech signals depending on the received control signal.

A control signal is preferably received by radio or inductively. In such cases, wireless transmission systems such as Bluetooth are suitable for covering short distances. Basically however other short-range transmission systems, such as infrared systems for example, are conceivable.

The inventive radio transmission apparatus can feature a configuration device with which the radio transmission apparatus is able to be configured automatically depending on the received control signal. In particular the radio transmission apparatus can be switched automatically to a corresponding radio channel on the basis of the control signal. For example a different radio channel can be set automatically in each room, in order to avoid events being held in adjacent rooms disturbing each other.

In addition the radio transmission apparatus can be equipped with a number of microphones and a mixer, so that speech signals are able to be transmitted mixed from a number of persons or devices. This is especially advantageous when a number of teachers are sharing the teaching in a room.

It is particularly advantageous for the radio transmission apparatus to be embodied as a portable device. The radio transmission apparatus can also feature a number of portable radio units so that a number of teachers in a room can be equipped with a corresponding transmitter.

The control signal can consist of a sequence of at least two signal parts of different transmitters. This allows comparatively low-cost transmitters to be used for obtaining position and movement-specific information.

A control apparatus for controlling a radio transmission device with which speech signals are able to be transmitted in an events room is also provided within the framework of the invention, with a detection device to detect a presence or a movement of the radio transmission device in the events room and a transmit device for transmitting a control signal to the radio transmission device depending on the detection result from the detection device.

In addition there is also provision in accordance with the invention for a corresponding method for controlling a radio transmission device with which speech signals are transmitted in an events room, by detecting a presence or a movement of the radio transmission device in the events room and transmitting a control signal to the radio transmission device depending on the detection result.

The control apparatus advantageously includes two detection units which are able to be built into a door frame in order to detect a direction of movement of the radio transmission device. This makes it possible to detect whether a teacher is entering or leaving the classroom and to control their radio device accordingly so that it switches on or switches off.

The detection device can also feature a localization unit for localization of the radio transmission device in the events room. Preferably the localization unit has at least two separate directional antennas. This makes it possible, not only to establish the presence of a teacher in the classroom, but also their exact location, so that their radio transmission device can also be configured depending on its location within the classroom.

Furthermore the detection device can also be embodied for detection of at least two radio transmission devices in the events room and for controlling the at least two radio transmission devices. This enables a number of radio transmission devices to be controlled or configured separately from one another in the events room.

BRIEF DESCRIPTION OF THE DRAWINGS

The invention will now be explained in more detail on the basis of the enclosed drawings, which show.

DETAILED DESCRIPTION OF THE INVENTION

The exemplary embodiments described in greater detail below represent preferred embodiments of the present invention.

Figure 1:
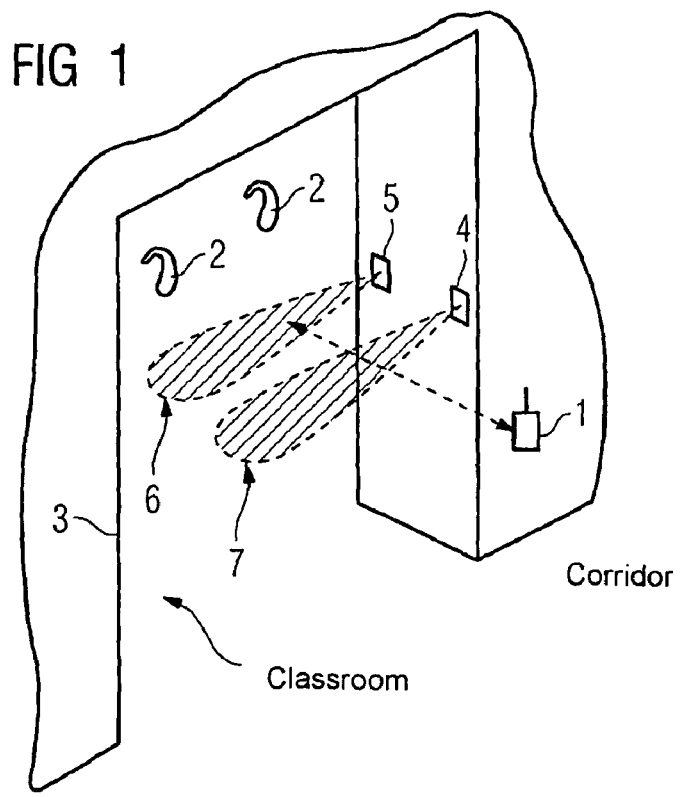
FIG. 1 a radio system in accordance with an embodiment of the present invention and FIG. 2 a radio system in accordance with a further embodiment, viewed from above.

According to the example depicted in FIG. 1, an inventive radio system consists of a transmitter unit 1, which is worn by a teacher for example, and one or more receivers 2, which are embodied here as hearing devices. The hearing devices 2 are worn by school students in this case. With this system it is possible for the teacher to transmit the acoustic information provided by radio to the hearing devices 2 of the school students.

The school students with the hearing devices 2, but also with earpieces or headsets as receivers, are located in a classroom. On entering the classroom, the teacher carries his transmitter 1 through a door 3. The transmitter 1 switches on automatically at this point. This is made possible by two directional antennas 4, 5 arranged in the doorposts or in front of or behind the door 3. The two directional antennas 4, 5 are part of a short-range transmitter. Each of the two antennas 4, 5 emits signals in a respective directional beam 6, 7. The fact that the two directional beams 6, 7 are spatially separated from one another means that the transmit device 1 equipped with a microphone can separately establish its passage through the two directional beams 6, 7.

If the two antennas 4, 5 are transmitting with different frequencies or with different signal patterns, the transmitter 1 can also determine the direction in which someone is moving when passing through the doorway. Depending on the direction, the transmitter 1 can then be switched on or off. In the present example this fact can be utilized to switch off the transmitter 1 if the teacher leaves a classroom.

The evaluation intelligence can however also lie in a control apparatus, which uses the two antennas 4, 5 or corresponding transmitters. This control apparatus detects a movement into/out of the classroom for example through reflection or signals from transmitter 1. A control signal sent out subsequently switches the transmit device 1 on or off.

Figure 2:
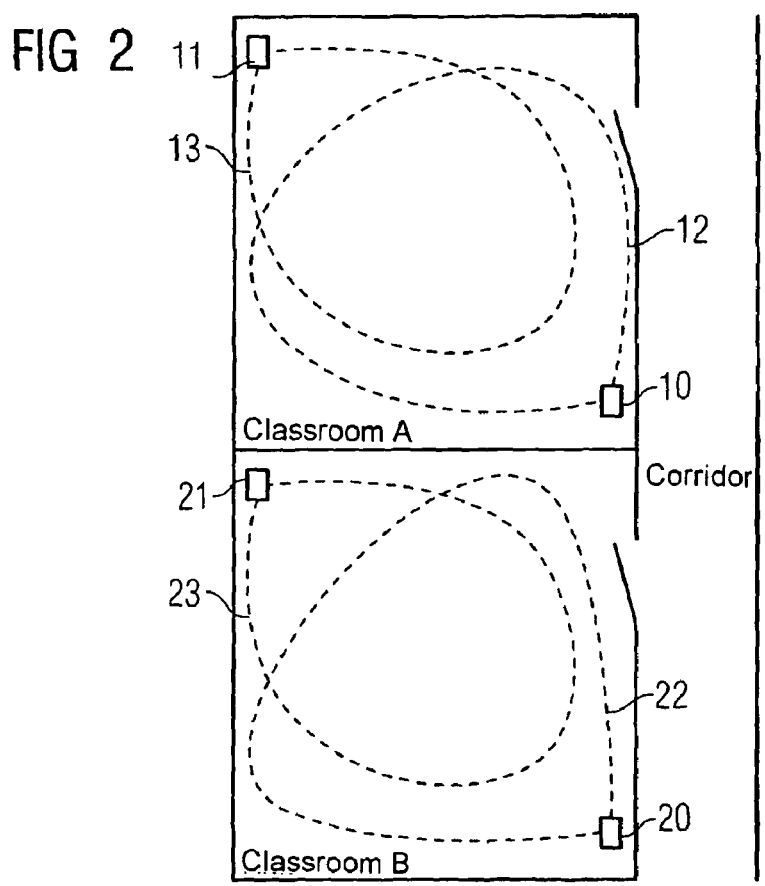

A further exemplary embodiment of the inventive microphone radio system is outlined in FIG. 2. Here the figure shows a view from above of two classrooms and a corridor. There are two antennas 10 and 11 in classroom A. These antennas 10 and 11 likewise emit directional beams 12, 13. The two directional beams 12, 13 are used here to cover or scan the whole classroom. If a transmit device 1 (not shown in FIG. 2) is located in classroom A and if it is within one of the directional beams 12, 13, then it can use the received transmit signal to switch itself on automatically.

If the teacher with the transmitter 1 leaves classroom A and goes into the corridor in which the transmitter 1 no longer receives radio waves, the transmitter 1 switches itself off automatically. This prevents the teacher's conversations in the corridor being overheard by the students in classroom A.

If the teacher now enters classroom B, in which the antennas 20 and 21 are located, the teacher's transmit device switches on as soon as it comes into the detection range of the associated directional beams 22 and 23. Here too the beams 22 and 23 do not extend into the corridor, so that the teacher's transmit device is switched off automatically on departure from classroom B. The directional beams 12, 13 and 22, 23 in classrooms A and B are also aligned and dimensioned so that no overlapping occurs where possible.

The teacher's transmitter 1 can not only be switched on and off by the beams 6, 7, 12, 13, 22, 23 but can also be configured by them. This means that the transmitter or the microphone radio system is configurable in a location-based manner. In particular the teacher's transmitter 1 can be set automatically to a classroom-specific radio channel setting on entry into the classroom. In another classroom the transmitter automatically sets itself to another radio channel. In this manner too disturbances between radio systems of two adjacent classrooms can be avoided.

If the transmitters belonging to the antennas 4, 5, 10, 11, 20, 21 are also in a position to be able to vary their transmit signal depending on the time, the configuration of the radio system can be made dependent on the time of day for example. In addition transmitters installed in the classroom can also be configured by the receivers for example, if they possess corresponding interfaces.

The configuration of the FM radio system can also relate to the receivers 2. Above and beyond this additional conditions or equipment of a room can be taken into account in the configuration of FM transmitters and/or receivers. This is especially useful if the data is transmitted digitally.

If a loudspeaker system is also installed in a classroom for example, the teacher's speech signal will also be switched to the loudspeaker. The radio receivers on the students' hearing devices can then remain switched off if necessary.

In this exemplary embodiment too the antennas 10, 11, 20, 21 can be part of a control apparatus, with the antennas initially being used to detect a transmit device 1 and subsequently to transmit a corresponding control signal to the transmit device 1.

If there is more than one transmitter in the room, this is detected automatically by one of the transmit devices or by the control apparatus with detection device as soon as the relevant persons enter the room. The second transmitter added is then automatically mixed with the existing transmitter. To this end the transmitter 1 receives the signal from transmitter 2, adds the signal to its own signal and transmits it to the students. This means that at least the first transmitter must then also be equipped with a receiver. This multi-transmitter mode enables two or more teachers to speak simultaneously over the radio system to the students.

Instead of a further teacher a video or stereo system can also serve as an additional transmitter for example and thus be integrated into the teaching. The students can then hear all sources via their FM receivers.

Antennas 10, 11 in classroom A can be placed so that a precise determination of the location of transmitter 1 or of the teacher in classroom A is possible. This additionally obtained location information is used where necessary to transmit location-specific signals from the antennas 10, 11. With these control signals the transmitter 1 can then be configured on a location-specific basis. For example the transmit signal amplitudes of the transmitter 1 are then able to be varied depending on the location in the events room. Other location-dependent configuration options relate to noise suppression measures and filtering.

The invention claimed is:

1. A control apparatus for controlling a radio transmission device to transmit a speech signal in an event room, comprising:
   a detecting device that detects a movement of the radio transmission device in the event room; and
   a transmitting device that transmits first and second control signals to the radio transmission device depending on the detection, the first control signal switches the said radio transmission device on and the second control signal switches the radio transmission device off;
   wherein the detecting device comprises two detection units that are built into a door frame of the event room or in front of or behind the door frame in order to detect a direction of the movement of the radio transmission device, wherein the detection units comprise a localization unit that locates the radio transmission device in the event room, wherein the localization unit comprises a plurality of separate directional antennas, wherein the transmission device transmits the first control signal when the localization unit locates the radio transmission device in the event room and transmit the second control signal when the localization unit locates the radio transmission device out of the event room.

2. The control apparatus as claimed in claim 1, wherein the detecting device detects movements of a plurality of radio transmission devices in the event room.

3. A method for controlling a radio transmission device to transmit a speech signal in an event room, comprising:
   detecting a movement of the radio transmission device in the event room by a detecting device comprising two detection units;
   building the detection units into a door frame of the event room or in front of or behind the door frame in order to detect a direction of the movement of the radio transmission device;
   locating the radio transmission device in the event room by a plurality of separate directional antennas arranged in the detection units;
   transmitting first and second control signals based on the detection, the first control signal switches the radio transmission device on and the second control signal switches the radio transmission device off;
   operating the radio transmission device depending on the first and second control signals;
   transmitting the first control signal when the radio transmission device is located in the event room and transmitting the second control signal when the radio transmission device is located outside the event room; and
   switching the radio transmission device on if the radio transmission device receives the first control signal and switching the radio transmission device off if the radio transmission device receives the second control signal.

4. The method as claimed in claim 3, wherein the radio transmission device is configured automatically based on the control signal.

5. The method as claimed in claim 4, wherein the radio transmission device is switched automatically into a radio channel based on the control signal.

6. The method as claimed in claim 3, wherein a plurality of speech signals from a plurality of sound sources are mixed and transmitted by the radio transmission device.

7. The method as claimed in claim 3, wherein the radio transmission device receives the control signal in the event room or at an entrance of the event room.

* * * * *